United States Patent
Fujito et al.

(10) Patent No.: US 12,092,618 B2
(45) Date of Patent: Sep. 17, 2024

(54) EXTRACT RECOVERY METHOD AND ANALYSIS METHOD USING POLYMER BEADS IN A TRAP WHEN USING SUPERCRITICAL EXTRACTION

(71) Applicant: Shimadzu Corporation, Kyoto (JP)

(72) Inventors: Yuka Fujito, Columbia, MD (US); Risa Ishii, Hitachi (JP); Michio Butsugan, Hitachi (JP); Keita Sakurai, Hitachi (JP)

(73) Assignee: SHIMADZU CORPORATION, Kyoto (JP)

( * ) Notice: Subject to any disclaimer, the term of this patent is extended or adjusted under 35 U.S.C. 154(b) by 855 days.

(21) Appl. No.: 17/046,600

(22) PCT Filed: Apr. 4, 2019

(86) PCT No.: PCT/JP2019/014909
§ 371 (c)(1),
(2) Date: Dec. 14, 2020

(87) PCT Pub. No.: WO2019/198605
PCT Pub. Date: Oct. 17, 2019

(65) Prior Publication Data
US 2021/0116425 A1    Apr. 22, 2021

(30) Foreign Application Priority Data
Apr. 13, 2018   (JP) .................... 2018-077938

(51) Int. Cl.
*G01N 30/14*    (2006.01)
*B01D 11/02*    (2006.01)
(Continued)

(52) U.S. Cl.
CPC .......... *G01N 30/14* (2013.01); *B01D 15/206* (2013.01); *B01D 15/40* (2013.01); *B01J 20/261* (2013.01);
(Continued)

(58) Field of Classification Search
CPC ............. B01D 11/0203; B01D 11/028; B01D 11/0288; B01D 11/0403; B01D 15/206;
(Continued)

(56) References Cited

U.S. PATENT DOCUMENTS 4,892,654 A * 1/1990 Nickerson ............... G01N 30/08
210/659
4,984,602 A * 1/1991 Saito ...................... G01N 30/32
251/129.05
(Continued)

FOREIGN PATENT DOCUMENTS

JP   58032164 A *  2/1983   .............. B01J 20/26
JP   60-8747 A       1/1985
(Continued)

OTHER PUBLICATIONS

Gemmel et al, Separation of Oligomers of Medium Polarity by Packed Column Supercritical Fluid Chromatography, Chromatographia vol. 27, No. 11 /12, Jun. 1989 (Year: 1989).*
(Continued)

*Primary Examiner* — David L Singer
(74) *Attorney, Agent, or Firm* — Sughrue Mion, PLLC (57) ABSTRACT

Supercritical fluid extraction can experience problems of prolonged extraction times and undesired elution of target components of a trap sample. To resolve these problems, a sample is stored in a container (125) disposed upstream of a back-pressure control valve (140). A mixed fluid of carbon dioxide in a supercritical state and a modifier is introduced into the container, and a component contained in the sample
(Continued)

is extracted. The extracted component is introduced into a trap column (135) together with the carbon dioxide and the modifier and collected in the trap column. The trap column is loaded with polymer beads as a filler to securely collect an extracted component in the trap column, even when the modifier in the supercritical fluid is increased.

7 Claims, 3 Drawing Sheets

(51) Int. Cl.
| | |
|---|---|
| *B01D 11/04* | (2006.01) |
| *B01D 15/20* | (2006.01) |
| *B01D 15/40* | (2006.01) |
| *B01J 20/26* | (2006.01) |
| *B01J 20/28* | (2006.01) |
| *B01J 20/281* | (2006.01) |
| *B01J 20/285* | (2006.01) |
| *G01N 1/40* | (2006.01) |
| *G01N 30/32* | (2006.01) |
| *G01N 30/72* | (2006.01) |
| *G01N 30/80* | (2006.01) |
| *G01N 30/08* | (2006.01) |
| *G01N 30/56* | (2006.01) |

(52) U.S. Cl.
CPC ....... *B01J 20/267* (2013.01); *B01J 20/28019* (2013.01); *B01J 20/28052* (2013.01); *B01J 20/281* (2013.01); *B01J 20/285* (2013.01); *G01N 1/405* (2013.01); *G01N 30/32* (2013.01); *G01N 30/7206* (2013.01); *G01N 30/7233* (2013.01); *G01N 30/80* (2013.01); *B01D 11/0203* (2013.01); *B01D 11/0403* (2013.01); *B01J 20/28004* (2013.01); *B01J 2220/54* (2013.01); *G01N 2030/085* (2013.01); *G01N 2030/328* (2013.01); *G01N 2030/565* (2013.01)

(58) Field of Classification Search
CPC ....... B01D 15/40; B01J 20/261; B01J 20/267; B01J 20/28004; B01J 20/28019; B01J 20/28052; B01J 20/281; B01J 20/285; B01J 2220/54; G01N 1/405; G01N 2030/085; G01N 2030/324; G01N 2030/328; G01N 2030/565; G01N 30/08; G01N 30/14; G01N 30/32; G01N 30/7206; G01N 30/7233; G01N 30/80; Y02C 20/40
See application file for complete search history.

(56) References Cited

U.S. PATENT DOCUMENTS

| | | | |
|---|---|---|---|
| 5,198,115 A | 3/1993 | Stalling et al. | |
| 5,281,406 A * | 1/1994 | Stalling | B82Y 40/00 423/445 B |
| 2004/0000522 A1 * | 1/2004 | Xie | B01J 8/0005 210/143 |
| 2005/0061745 A1 * | 3/2005 | Xie | B01J 8/0005 210/656 |
| 2006/0247362 A1 | 11/2006 | Shah | |
| 2014/0217031 A1 | 8/2014 | Wang et al. | |
| 2015/0182943 A1 * | 7/2015 | Shibata | B01J 20/28064 502/402 |
| 2016/0202218 A1 * | 7/2016 | Owa | G01N 30/16 73/23.41 |
| 2016/0274071 A1 * | 9/2016 | Yamamoto | F04B 39/06 |
| 2017/0045482 A1 * | 2/2017 | Goto | G05B 19/46 |
| 2017/0276652 A1 | 9/2017 | Funada | |
| 2018/0050282 A1 | 2/2018 | Nagai et al. | |
| 2019/0001238 A1 * | 1/2019 | Shibata | C08F 292/00 |

FOREIGN PATENT DOCUMENTS

| | | | | | |
|---|---|---|---|---|---|
| JP | S62152505 | A | * | 7/1987 | ............ B01D 11/00 |
| JP | 64-7906 | A | | 1/1989 | |
| JP | 2003-083946 | A | | 3/2003 | |
| JP | 2008-45906 | A | | 2/2008 | |
| JP | 2010243258 | A | * | 10/2010 | ........... B01D 15/166 |
| JP | 2014-517323 | A | | 7/2014 | |
| JP | 2015215320 | A | * | 12/2015 | ............ G01N 30/02 |
| JP | 2016-011835 | A | | 1/2016 | |
| JP | 2016114574 | A | * | 6/2016 | ............ G01N 30/02 |
| JP | 2016173342 | A | * | 9/2016 | ............ F04B 15/08 |
| WO | 2015/039247 | A1 | | 3/2015 | |
| WO | WO-2016031008 | A1 | * | 3/2016 | ............ B01D 15/40 |
| WO | WO-2016042618 | A1 | * | 3/2016 | ............ B01D 19/00 |
| WO | WO-2016046990 | A1 | * | 3/2016 | ............ B01D 11/04 |
| WO | WO-2016088252 | A1 | * | 6/2016 | ............ G01N 30/02 |
| WO | WO-2016092662 | A1 | * | 6/2016 | ............ G01N 30/02 |
| WO | 2016/152996 | A1 | | 9/2016 | |
| WO | WO-2016147379 | A1 | * | 9/2016 | ............ F16L 53/38 |
| WO | WO-2017056307 | A1 | * | 4/2017 | ............ G01N 30/02 |
| WO | 2017/127519 | A1 | | 7/2017 | |

OTHER PUBLICATIONS

Jose et al, Tuning the pore size and surface area of monodisperse Poly(Methyl Acrylate) beads via parallel seeded polymerisation, A.J. Jose et al. / Polymer 46 (2005) 2880-2888 (Year: 2005).*
Pardeshi et al, Precipitation polymerization: a versatile tool for preparing molecularly imprinted polymer beads for chromatography applications, Royal Society of Chemistry Adv., 2016, 6, 23525-23536 (Year: 2016).*
Extended European Search Report dated Dec. 2, 2021 from the European Patent Office in EP application No. 19785750.1.
International Search Report for PCT/JP2019/014909 dated Jul. 9, 2019 (PCT/ISA/210).
Written Opinion for PCT/JP2019/014909 dated Jul. 9, 2019 (PCT/ISA/237).
Office Action issued Feb. 15, 2022 in Japanese Application No. 2018-077938.
"Improved sample pretreatment using offline SFE", Shimadzu Application news, Jan. 1, 2016, pp. 1-8 (8 pages total), Retrieved from https://www.an.shimadzu.co.jp/hplc/support/lib/pdf/c190-0444.pdf.

* cited by examiner

EXTRACT RECOVERY METHOD AND ANALYSIS METHOD USING POLYMER BEADS IN A TRAP WHEN USING SUPERCRITICAL EXTRACTION

CROSS REFERENCE TO RELATED APPLICATIONS

This application is a National Stage of International Application No. PCT/JP2019/014909 filed Apr. 4, 2019, claiming priority based on Japanese Patent Application No. 2018-077938 filed Apr. 13, 2018.

TECHNICAL FIELD

The present invention relates to a method for recovering a component extracted from a sample by supercritical fluid extraction and to a method for analyzing the extracted component.

BACKGROUND ART

As detection and quantitative analysis of a component contained in a biological sample such as blood, an agricultural product, food, soil, or the like, chromatography or mass spectrometry, or an analysis method (e.g., liquid chromatography (LC)/mass spectrometry (MS) and gas chromatography (GC)/MS) combining these methods is used. The biological sample, agricultural product, food, soil, and the like are mixtures of various chemical substances. In analysis of a minor component in such a complicated mixture, the precision of the analysis is sometimes degraded due to background noise or the like derived from impurities. Therefore, extraction of a target component to be analyzed is performed as preprocessing of the analysis.

As a method capable of highly efficiently extracting a target component from various analysis samples, supercritical fluid extraction (SFE) is known. A supercritical fluid has high dispersion force into a sample and exhibits excellent solubility in many substances. Carbon dioxide (critical temperature: 31° C., critical pressure: 7.4 MPa) is widely used as the supercritical fluid. Using a mixed fluid obtained by adding an organic solvent (modifier) such as methanol to the supercritical fluid improves the extraction efficiency and enables a wide range of substances from a low-polarity substance to a high-polarity substance to be simultaneously extracted.

Patent Document 1 discloses a method for once collecting, in a trap column, a component (component to be analyzed) extracted by the SFE, and then recovering the collected substance by solvent extraction. Used as the trap column is, similarly to an analysis column of supercritical fluid chromatography (SFC), one containing, as a filler, silica gel or a silica carrier having a surface thereof chemically modified.

PRIOR ART DOCUMENT

Patent Document

Patent Document 1: JPS 60-8747 A

SUMMARY OF THE INVENTION

Problems to be Solved by the Invention

The analysis of a minor component can be made by collecting, in a trap column, a component extracted with a supercritical fluid, then recovering an eluent, and analyzing the extracted component. The use of the trap column enables many components extracted under different extraction conditions by the SFE to be recovered with one fraction and thus makes simultaneous multicomponent analysis possible by chromatography, mass spectrometry, or the like. In the multicomponent extraction by the SFE, the components have different extraction conditions, so that comprehensive extraction of target components from a sample requires the extraction time to be prolonged or the concentration of a modifier to be increased.

The increase of the concentration of the modifier in the SFE sometimes does not allow a column filler to sufficiently retain a component having less interaction with the filler and causes the component to be eluted. When a single extracted component is recovered, a filler that has a chemically modified group having strong interaction (retaining force) with the component to be recovered can be selected to prevent undesired elution of the target component collected in the trap column.

The comprehensive multicomponent extraction and recovery (for example, extraction of residual agricultural chemicals in an agricultural product by the SFE), however, requires collection of a wide range of substances from a low-polarity compound to a high-polarity compound in the trap column and simultaneous elution of the many components in the elution. When silica gel or chemically modified silica is used as the filler of the trap column, an increase of the concentration of the modifier causes a part of target components to be eluted from the trap column, damaging an advantage of the SFE, i.e., simultaneous extraction of a plurality of types of components having a wide range of polarities. In view of the problems described above, an object of the present invention is to provide a method for extracting a component contained in a sample by the SFE and recovering and/or analyzing the extract.

Means for Solving the Problems

As a result of a study by the inventors of the present invention, the inventors have found that use of a prescribed resin material as a carrier of the trap column increases the force of the filler for retaining a wide range of substances to enable simultaneous multicomponent extraction and recovery.

The present invention relates to a method for recovering a component extracted by supercritical fluid extraction (SFE) and to a method for analyzing the extracted component. A container sores a sample and is disposed upstream of a back-pressure control valve. A mixed fluid of carbon dioxide in a supercritical state and a modifier is introduced into the container, and a component contained in the sample is extracted. The extracted component is introduced into a trap column together with the carbon dioxide and the modifier and collected in the trap column. The trap column is loaded with a filler, polymer beads made from a resin material such as an acrylic polymer. The trap column may be disposed upstream of the back-pressure control valve.

After collecting, in the trap column, the component extracted by the SFE, an eluent is introduced into the trap column to elute and recover the extracted component. The recovered solution is analyzed by chromatography, mass spectrometry, or the like. The eluent from the trap column may be introduced online into a chromatograph, a mass spectrometer, or the like and analyzed.

Effects of the Invention

The use of the polymer beads as the filler of the trap column in the SFE enables an extracted component to be securely collected in the trap column even when the concentration of the modifier in the SFE is increased. Thus, it is possible to extract, by the SFE, many substances that are contained in a sample and have different polarities and simultaneously analyze the many substances by chromatography, mass spectrometry, or the like.

BRIEF DESCRIPTION OF THE DRAWINGS

FIGS. 4A to 4C are multiple reaction monitoring (MRM) chromatograms of supercritical fluid chromatography in Experiment Examples 1 to 3.

FIG. 5-1 is chromatograms of resmethrin, benthiocarb, bromophos-methyl, bifenthrin, and tolchlofos-methyl in Experiment Examples 2 and 3.

FIG. 5-2 is chromatograms of prothiofos, fenoxaprop-ethyl, nitralin, sulprophos, carbophenothion, hexythiazox, and silafluofen in Experiment Examples 2 and 3.

FIG. 6 is chromatograms of online SFE-SFC-MS analysis of acibenzolar acid, acifluorfen, lufenuron, mesosulfuron-methyl, foramsulfuron, and acetamiprid.

MODE FOR CARRYING OUT THE INVENTION

Figure 1:
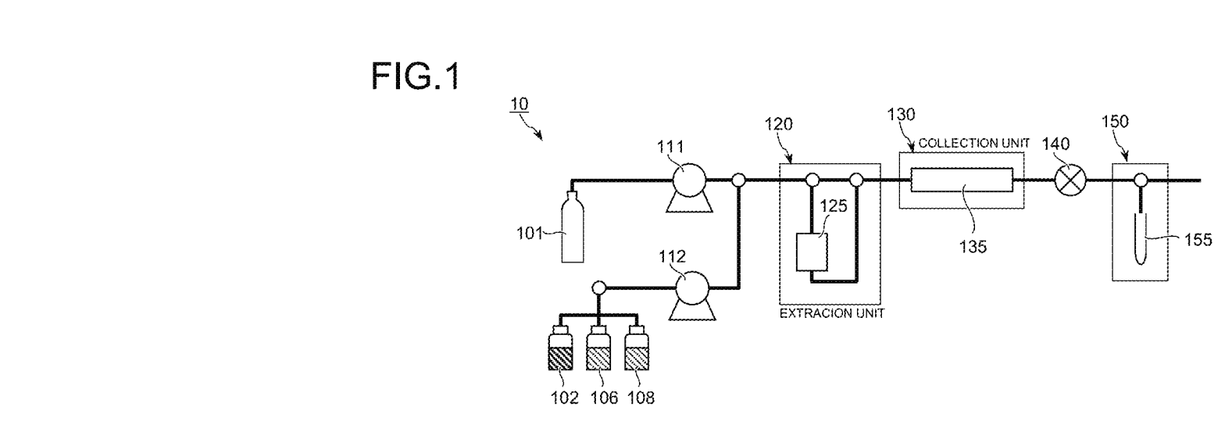
FIG. 1 is a schematic block diagram of a supercritical fluid extraction apparatus.

FIG. 1 is a schematic block diagram illustrating a configuration example of a supercritical fluid extraction apparatus. This supercritical fluid extraction apparatus 10 is an offline apparatus that once collects, in a trap column 135, a component extracted from a sample and then elutes the component with a solvent. The supercritical fluid extraction apparatus includes, as a collection unit 130, a column oven including the trap column 135, and includes a recovery unit 150 downstream of a back-pressure control valve 140. The supercritical fluid extraction apparatus 10 includes a cylinder 101, a pressure pump 111, a solvent container 102, a solvent pump 112, and an extraction unit 120 that are provided upstream of the back-pressure control valve 140. FIG. 1 illustrates a form in which the collection unit 130 is disposed upstream of the back-pressure control valve 140.

The extraction unit 120 houses an extraction container 125 storing a sample. Hereinafter, a method for extracting and recovering residual agricultural chemicals that are contained in an agricultural product stored in the extraction container 125 is described with reference to FIGS. 2A to 2C.

(Supercritical Fluid Extraction)

The extraction container 125 storing an agricultural product as the sample is set in the extraction unit 120, and is set at a prescribed value of temperature by a temperature control means (not illustrated). When the temperature of the extraction container reaches the set value, carbon dioxide is introduced from the cylinder 101 via the pressure pump 111 into the extraction unit 120. The pressure in a flow path of the extraction unit 120 is made exceeding the critical pressure (7.4 MPa) of carbon dioxide by the pressure pump 111 and the back-pressure control valve 140, and the temperature of the extraction container is set to exceed the critical temperature (31° C.) of carbon dioxide. The carbon dioxide in the supercritical state dissolves the sample (agricultural product) in the extraction container 125. This allows the residual agricultural chemicals and the like as target components in the sample to be extracted.

Figure 2A:
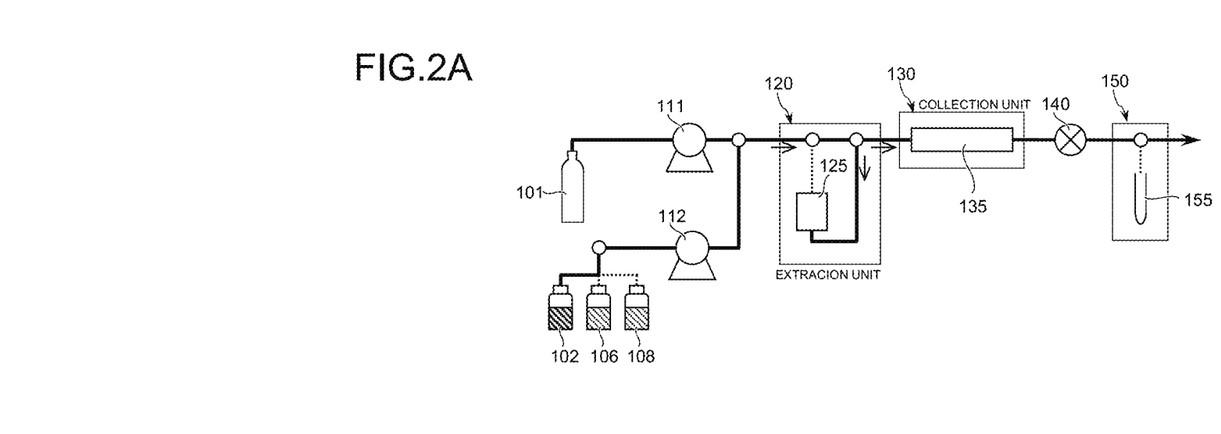
FIG. 2A is a block diagram schematically illustrating static extraction.
Figure 2B:
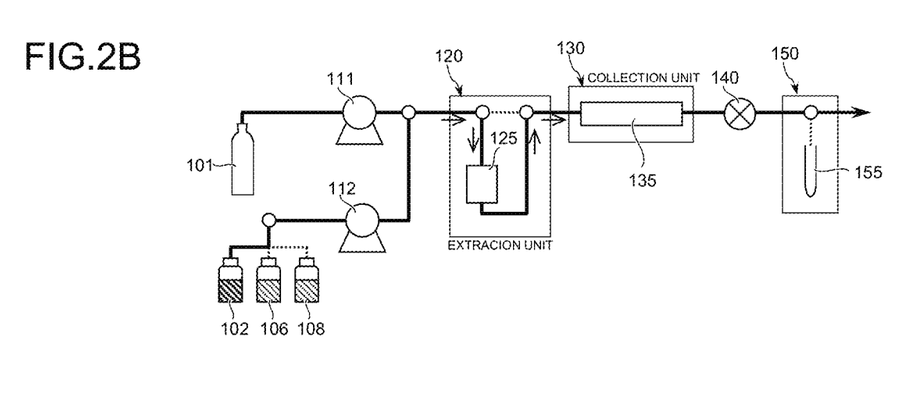
FIG. 2B is a block diagram schematically illustrating dynamic and static extraction and collection of an extracted component in a trap column.

The SFE is performed only by dynamic extraction or by a combination of static extraction and dynamic extraction. In the static extraction, the carbon dioxide in the supercritical state is introduced into the extraction container 125 as illustrated in FIG. 2A. In the dynamic extraction, the carbon dioxide in the supercritical state is introduced into the extraction container 125 making a liquid pass therethrough, to perform the extraction as illustrated in FIG. 2B. In the static extraction and the dynamic extraction, the solvent pump 112 may be operated to introduce a modifier (an organic solvent such as methanol) in the solvent container 102 into the extraction unit 120.

When residual agricultural chemicals in an agricultural product are extracted, the conditions of the SFE are required to be adjusted so as to comprehensively extract various components from a hydrophobic substance to a hydrophilic substance. Specifically, the hydrophobic substance is sometimes extracted only with the carbon dioxide in the supercritical state without the modifier, whereas the extraction of a high-polarity hydrophilic substance requires an increase of the concentration of the modifier.

(Collection of Extracted Component)

The components extracted from the sample by the SFE are sent to the trap column 135 in the collection unit 130 together with the carbon dioxide and the modifier. The trap column 135 is loaded with polymer beads as a filler.

During the dynamic extraction (FIG. 2B), the carbon dioxide and the modifier are flowed through the trap column as a mobile phase of chromatography. The trap column 135 disposed upstream of the back-pressure control valve 140 is subjected to a pressure exceeding the critical pressure (7.4 MPa) of the carbon dioxide, so that the filler of the trap column 135 is required to have pressure resistance. Further, the filler of the trap column is required to retain the extracted components even when the concentration of the modifier is increased.

When silica gel or chemically modified silica is used as the filler of the trap column, the filler sometimes allows the extracted components collected in the trap column to be eluted due to insufficient retaining force of the filler. Particularly, extracting a plurality of types of components having different polarities by the SFE prolongs the extraction time, and thus makes a component first extracted and collected in the trap column easily desorb from the filler due to action of a high-concentration modifier, to make it difficult for the filler to appropriately retain the multiple components.

In the present invention, polymer beads are used as the filler in the trap column 135. The use of the polymer beads improves the force of the filler for retaining the extracted components and enables the extracted components to be kept in the trap column even when the concentration of the modifier is increased.

When the trap column 135 is disposed upstream of the back-pressure control valve 140, the polymer beads serving as the filler are required to have pressure resistance, so that the polymer beads preferably contain a crosslinked polymer. The polymer beads are also required to have high solvent resistance so as not to cause swelling or contraction even when the mixing ratio between the carbon dioxide and the modifier is changed. Therefore, the polymer beads having a low degree of swelling with respect to solvents are preferably used.

The polymer beads preferably have a degree of swelling of 1.4 or less when absorbing either tetrahydrofuran or methanol. The use of such polymer beads having a low degree of swelling allows the filler to have an excellent property for retaining the extracted components and helps a good result be easily given due to high durability of the polymer beads, even when the recovery operation and the analysis are repetitively performed.

The degree of swelling of the polymer beads is determined on the basis of the change in volume between before and after dispersion of the polymer beads into a solvent. The polymer beads have a degree of swelling of more preferably 1.3 or less, further preferably 1.2 or less when absorbing either tetrahydrofuran or methanol. The degree of swelling is generally 1.0 or more.

The polymer beads may have an average particle size of 10 μm or less, 5 μm or less, or 4 μm or less. From the viewpoint of suppressing an excessive rise of the pressure in the column, the polymer beads may have an average particle size of, for example, 1 μm or more or 2 μm or more. An index representing the variation in the particle size (diameter) of the polymer beads, or a coefficient of variation (CV) value is preferably smaller and may be, for example, 25% or less, 20% or less, 15% or less, or 10% or less. The lower limit of the CV value is not particularly limited, but is generally 1% or more. For the purpose of, for example, adjusting the average particle size and the CV value, the polymer beads may be classified with a sieve or the like.

The polymer beads having a higher degree of crosslinking of polymer tend to have a smaller degree of swelling. The crosslinked polymer contained in the polymer beads has a degree of crosslinking of, for example, 50% or more, 80% or more, or 90% or more. The degree of crosslinking of the crosslinked polymer is the blending proportion of a crosslinkable monomer in monomers used for polymerization and is defined as the proportion of the mass of the crosslinkable monomer in the total mass of polymerizable monomers.

The crosslinkable monomer is a compound having two or more polymerizable functional groups, and examples include divinyl compounds such as divinylbenzene, divinylbiphenyl, and divinylnaphthalene; diallyl phthalate and isomers thereof; triallyl isocyanurate and derivatives thereof; and multifunctional (meth)acrylic acid esters. The crosslinkable monomers may be used alone or in combination of two or more thereof. Examples of the multifunctional (meth) acrylic acid esters include di(meth)acrylic acid esters and tri- or more functional (meth)acrylic acid esters.

Examples of the di(meth)acrylic acid esters include alkanediol di(meth)acrylates having an alkylene group to which two (meth)acrylates are bonded. The alkylene group may have, for example, 1 to 20 or 1 to 5 carbon atoms. The alkylene group may be linear, branched, or cyclic. The alkylene group may have a substituent such as a hydroxy group.

Examples of the alkanediol di(meth)acrylates include 1,3-butanediol diacrylate, 1,4-butanediol di(meth)acrylate, 1,5-pentanediol di(meth)acrylate, 1,6-hexanediol di(meth) acrylate, 1,7-heptanediol di(meth)acrylate, 1,8-octanediol di(meth)acrylate, 3-methyl-1,5-pentanediol di(meth)acrylate, 1,9-nonanediol di(meth)acrylate, 1,10-decanediol di(meth)acrylate, neopentyl glycol di(meth)acrylate, and glycerol dimethacrylate.

Other examples of the di(meth)acrylic acid esters include di(meth)acrylates such as ethoxylated bisphenol A di(meth) acrylate, propoxylated ethoxylated bisphenol A di(meth) acrylate, tricyclodecanedimethanol di(meth)acrylate, 1,1,1-trishydroxymethylethane di(meth)acrylate, and ethoxylated cyclohexanedimethanol di(meth)acrylate; and (poly)alkylene glycol di(meth)acrylates such as (poly)ethylene glycol di(meth)acrylate, (poly)propylene glycol di(meth)acrylate, and (poly)tetramethylene glycol di(meth)acrylate.

Examples of the tri or more functional (meth)acrylates include trimethylolpropane tri(meth)acrylate, tetramethylolmethane tri(meth)acrylate, tetramethylolpropane tetra(meth) acrylate, pentaerythritol tri(meth)acrylate, 1,1,1-trishydroxymethylethane tri(meth)acrylate, and 1,1,1-trishydroxymethylpropane triacrylate.

Among these crosslinkable monomers, at least one selected from the group consisting of, for example, divinylbenzene and di(meth)acrylic acid esters may be used because these monomers easily give a high crosslinking-density polymer (polymer having a high proportion of a structure derived from a multifunctional monomer) and are capable of decreasing the degree of swelling of the polymer beads. That is, the crosslinked polymer may contain a structural unit derived from divinylbenzene and/or a structural unit derived from a di(meth)acrylic acid ester. Particularly, as the filler of the trap column 135, acrylic polymer beads are preferably used that contain a di(meth)acrylic acid ester as a monomer component because such polymer beads are capable of efficiently collecting multiple components having a wide range of polarities, such as agricultural chemicals.

A monofunctional monomer may also be used together with the crosslinkable monomer. Examples of the monofunctional monomer include monofunctional (meth)acrylic acid esters such as methyl acrylate, ethyl acrylate, propyl acrylate, n-butyl acrylate, isobutyl acrylate, hexyl acrylate, 2-ethylhexyl acrylate, n-octyl acrylate, dodecyl acrylate, lauryl acrylate, stearyl acrylate, 2-chloroethyl acrylate, phenyl acrylate, methyl α-chloroacrylate, methyl methacrylate, ethyl methacrylate, propyl methacrylate, n-butyl methacrylate, isobutyl methacrylate, hexyl methacrylate, 2-ethylhexyl methacrylate, n-octyl methacrylate, dodecyl methacrylate, lauryl methacrylate, and stearyl methacrylate; styrenes such as styrene, o-methylstyrene, m-methylstyrene, p-methylstyrene, α-methylstyrene, o-ethylstyrene, m-ethylstyrene, p-ethylstyrene, 2,4-dimethylstyrene, p-n-butylstyrene, p-t-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene, and 3,4-dichlorostyrene, and derivatives thereof; vinyl esters such as vinyl acetate, vinyl propionate, vinyl benzoate, and vinyl butyrate; N-vinyl compounds such as N-vinylpyrrole, N-vinylcarbazole, N-vinylindole, and N-vinylpyrrolidone; fluorinated monomers such as vinyl fluoride, vinylidene fluoride, tetrafluoroethylene, hexafluoropropylene, trifluoroethyl acrylate, and tetrafluoropropyl acrylate; and conjugated dienes such as butadiene and isoprene. These monofunctional monomers may be used alone or in combination of two or more thereof.

The polymer beads may be entirely made from the crosslinked polymer or may partially contain the crosslinked polymer. From the viewpoint of lowering the degree of swelling, the polymer beads preferably contain the crosslinked polymer on at least outer layers thereof. The polymer beads containing the crosslinked polymer on the outer layers thereof are obtained, for example, by a seed polymerization method. Generally, the polymer beads sometimes have more difficulty being formed in small particle-size particles than silica gel or the like, but the seed polymerization method easily forms the small particle-size particles.

The seed polymerization method is a method for swelling seed particles in an emulsified liquid containing the polymerizable monomer to make the seed particles absorb the polymerizable monomer, and then polymerizing the polymerizable monomer. Examples of the seed particles include (meth)acrylate particles and styrene particles.

The (meth)acrylate particles are obtained by polymerization of a (meth)acrylic acid ester. Examples of the (meth)acrylic acid ester include the (meth)acrylic acid esters that have been described above and have a linear or branched alkyl group. Styrene particles can be obtained by polymerization of a styrene monomer such as styrene, p-methylstyrene, p-chlorostyrene, chloromethylstyrene, or α-methylstyrene. As a monomer for obtaining the seed particles, allyl alcohol, allyl phthalate, or ally ether may be used in combination with the (meth)acrylic acid ester or the styrene monomer. These monomers may be used alone or in combination of two or more thereof.

The seed particles can be synthesized using the above-described monomer by a known method such as an emulsion polymerization method, a soap-free emulsion polymerization method, or a dispersion polymerization method. The average particle size of the seed particles may be adjusted according to the designed particle size of the polymer beads to be obtained. The seed particles may have an average particle size of, for example, 2.0 μm or less or 1.5 μm or less, from the viewpoint of shortening the time for absorbing the polymerizable monomer. The seed particles may have an average particle size of, for example, 0.1 μm or more or 0.5 μm or more, from the viewpoint of efficiently obtaining seed particles that are uniform and close to sphere. From these viewpoints, the seed particles have an average particle size of preferably 0.1 to 2.0 μm, more preferably 0.5 to 2.0 μm, further preferably 0.5 to 1.5 μm.

The seed particles may have a CV value of, for example, 10% or less or 7% or less, from the viewpoint of sufficiently securing the uniformity of the polymer beads obtained. The seed particles generally have a CV value of 1% or more. The average particle size of the polymer beads may be adjusted to, for example, 2 to 10 times or 2.5 to 7 times the average particle size of the seed particles. The adjustment of the average particle size of the polymer beads in the above range makes the polymer beads monodisperse in terms of the particle size and thus lowers the CV value of the particle size.

The seed particles are added to an emulsified liquid containing the polymerizable monomer and an aqueous medium and made to absorb the polymerizable monomer, and then the polymerizable monomer is polymerized to give the polymer beads. The emulsified liquid can be prepared by a known method. For example, the emulsified liquid is obtained by adding the polymerizable monomer to the aqueous medium and dispersing the polymerizable monomer in the aqueous medium with microemulsification equipment such as a homogenizer, a sonicator, or a nanomizer. Examples of the aqueous medium include water and a mixed medium of water and a water-soluble solvent (for example, a lower alcohol). The aqueous medium may also contain a surfactant. As the surfactant, an anionic, cationic, non-ionic, or zwitterionic surfactant may be used.

The emulsified liquid may also contain a polymerization initiator such as an organic peroxide or an azo compound as necessary. The polymerization initiator can be used in the range of, for example, 0.1 to 7.0 parts by mass relative to 100 parts by mass of the polymerizable monomer. The emulsified liquid may also contain a polymer dispersion stabilizer such as polyvinyl alcohol or polyvinylpyrrolidone, to improve the dispersion stability of the seed particles. The polymer dispersion stabilizer can be used in the range of, for example, 1 to 10 parts by mass relative to 100 parts by mass of the polymerizable monomer. The emulsified liquid may also contain a water-soluble polymerization inhibitor such as a nitrite salt, a sulfite salt, a hydroquinone, an ascorbic acid, a water-soluble vitamin B, citric acid, or a polyphenol. The emulsified liquid containing the polymerization inhibitor is capable of suppressing emulsion polymerization of the monomer in the emulsified liquid.

The seed particles may be added to the emulsified liquid directly or may be added after having been dispersed in an aqueous dispersion. For example, the emulsified liquid to which the seed particles have been added can be stirred at room temperature for 1 to 24 hours to make the seed particles absorb the polymerizable monomer. The emulsified liquid that has been heated to about 30 to 50° C. tends to accelerate the absorption of the polymerizable monomer.

The mixing ratio of the polymerizable monomer to the seed particles is not particularly limited, but may be, for example, 800 parts by mass or more or 1500 parts by mass or more of the polymerizable monomer to 100 parts by mass of the seed particles, from the viewpoint of efficiently preparing the polymer beads having the desired average particle size. Meanwhile, the mixing ratio of the polymerizable monomer may be, for example, 100000 parts by mass or less or 35000 parts by mass or less to 100 parts by mass of the seed particles, from the viewpoint of suppressing unique suspension polymerization of the polymerizable monomer in the aqueous medium and efficiently preparing the polymer beads having the target average particle size. The seed particles absorb the polymerizable monomer to be swollen, so that the seed particles can be determined whether or not to have finished absorbing the polymerizable monomer by confirming the enlargement of the particle size of the seed particles with an optical microscope.

Subsequently, the polymerizable monomer absorbed in the seed particles is polymerized to give the polymer beads. The upper limit of the polymerization is not particularly limited, and may be appropriately selected according to, for example, the type of the monomer. After finishing the polymerization, the polymerization solution is subjected to centrifugal separation or filtration as necessary to remove the aqueous medium, and the polymer beads are isolated by washing with water and a solvent and following drying.

The polymer beads may have a porous structure. The porous beads are obtained, for example, by promoting phase separation during the seed polymerization using an insoluble or hardly soluble organic solvent in the aqueous medium.

The solvent used for filling the column with the polymer beads is not particularly limited as long as the solvent allows the polymer beads to be dispersed therein. Examples include water, methanol, tetrahydrofuran (THF), acetonitrile, chloroform, ethylene glycol, and a liquid paraffin. The fill pressure during filling of the column with the polymer beads may be adjusted to, for example, 6 MPa or more or 9 MPa or more. An increase of the fill pressure suppresses the tailing of a peak in an SFC chromatogram to allow the chromatogram to have a good peak shape. The fill pressure may also be adjusted to, for example, 60 MPa or less or 50 MPa or less, from the viewpoint of suppressing a change of the polymer beads or damage to the column.

(Elution and Recovery)

Figure 2C:
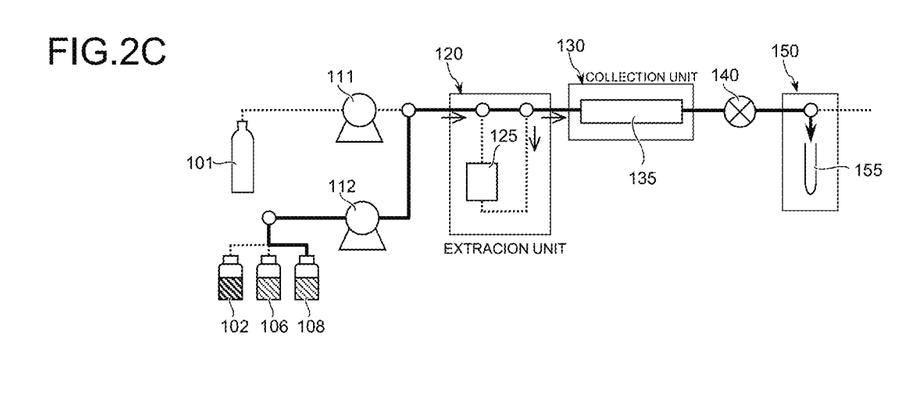
FIG. 2C is a block diagram schematically illustrating dynamic and static extraction.

After finishing the extraction, the introduction of the carbon dioxide from the cylinder 101 and the introduction of the modifier from the solvent container 102 are stopped, and the back-pressure control valve 140 is released to make the pressure in the apparatus 10 atmospheric. Thereafter, the sending of the solution from the solvent pump 112 is switched to make an eluent pass from a solvent container 108 through the trap column 135 and thus elute the extracted components collected in the trap column (FIG. 2C).

Before sending the eluent from the solvent container 108, a wash solution may be sent from another container 106 to the trap column 135 to remove, by washing, impurity components not retained by the filler. The eluent for eluting the extracted components collected in the trap column may be an organic solvent identical with the modifier. Gradient elution may be performed with a plurality of mobile phases. When a plurality of components contained in the sample are simultaneously analyzed, the plurality of components collected in the trap column are preferably simultaneously eluted, with a high-concentration organic solvent used as the eluent.

The eluent containing the components extracted from the sample is collected in a container 155 within the recovery unit 150. The eluent recovered in the container contains agricultural chemical components extracted from the sample. Using this eluent as an analysis sample, the residual agricultural chemicals can be simultaneously analyzed.

The analysis method is not particularly limited, but chromatography such as liquid chromatography or gas chromatography and mass spectrometry are suitable for the simultaneous analysis of the plurality of types of extracted components. Alternatively, the analysis may be performed by LS/MS, GC/MS, or the like combining the chromatography and the mass spectrometry. The mass spectrometry may be performed by multiple steps. The components detected by the analysis are identified, for example, by checking against a database.

The eluent is recovered in the single container 155 in FIG. 2C, but may be separately recovered in a plurality of containers through a fraction collector. As indicated in the embodiments below, the eluent may be subjected to online analysis, with a chromatograph or a mass spectrometer connected downstream of the trap column.

The present invention can be performed similarly to a conventional SFE except that the prescribed polymer beads are used as the filler of the trap column. The configuration of the supercritical fluid extraction apparatus is not limited to the apparatus illustrated in FIG. 1.

In FIG. 1, the extraction unit 120 houses the single extraction container 125, but may be configured to be capable of housing a plurality of extraction containers. In FIGS. 1 and 2A to 2C, the common solvent pump 112 is used to send the modifier in the SFE and send the eluent for eluting the collected components from the trap column 135. Different pumps, however, may be used for sending the modifier and for sending the eluent. For example, the pump for sending the eluent may be provided behind the back-pressure control valve 140.

FIG. 1 illustrates a form in which the collection unit 130 including the trap column 135 is disposed upstream of the back-pressure control valve 140. The trap column, however, may be provided downstream of the back-pressure control valve. The pressure downstream of the back-pressure control valve 140 is close to atmospheric pressure, so that the filling material in the trap column is not required to have high pressure resistance. The carbon dioxide in the supercritical state is, downstream of the back-pressure control valve 140, changed into gas to lose elution power. The modifier, however, has elution power even at normal pressure.

As described above, when silica gel or chemically modified silica is used as the filler of the trap column, an increase of the concentration of the modifier causes the extracted components collected in the trap column to be eluted due to insufficient retaining force of the filler and thus makes it difficult to appropriately collect multiple components. In contrast, using, as the filler of the trap column, the polymer beads having high retaining force suppresses the desorption of the extracted components caused by the modifier even in the form in which the trap column is disposed downstream of the back-pressure control valve, and enables the extracted components to be kept in the trap column.

As described above, the method according to the present invention uses, as the filler of the trap column, the polymer beads having excellent force for retaining various chemical substances, so that even when the SFE is performed with a high-concentration modifier, it is possible to comprehensively collect, in the trap column, the components extracted from the sample. Further, the present invention has an advantage of being capable of simultaneously eluting the components retained by the polymer bead filler, with a high-concentration organic solvent used as the eluent. Therefore, the method according to the present invention is applicable to, for example, preprocessing of a sample, for simultaneously analyzing multiple components extracted from the sample, i.e., for simultaneously analyzing residual agricultural chemicals in an agricultural product.

A technique of providing, downstream of the SFE unit, the trap column including the prescribed filler is not only useful for the recovery of the extracted components but is also applicable to inline analysis of the components extracted by the SFE. Examples of the inline analysis of the components extracted by the SFE include chromatography analysis and mass spectrometry. The chromatography and the mass spectrometry may be combined. The chromatography analysis performed downstream of the SFE unit may be supercritical chromatography (SFC).

Figure 3:
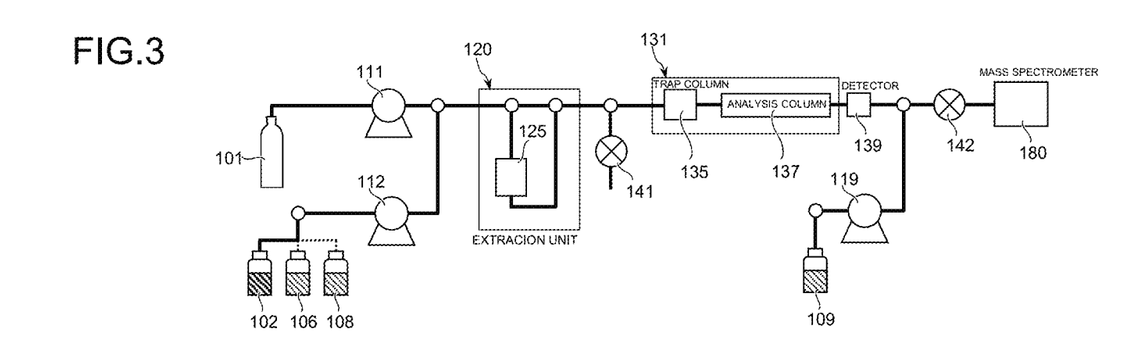
FIG. 3 is a block diagram illustrating one example of an online extraction-analysis system.

FIG. 3 is a block diagram illustrating one example of an online extraction-analysis system. In the system of FIG. 3, a column oven 131 provided downstream of the SFE unit 120 includes the trap column 135 and an SFC analysis column 137, and a mass spectrometer 180 is provided downstream of the column oven. A detector 139 is provided between the SFC analysis column 137 and the mass spectrometer 180 and is capable of detecting the components eluted from the SFC analysis column 137.

The configuration of this analysis system is similar to a conventional online SFE-SFC-MS analysis system except that the above-described polymer beads are loaded as the filler in the trap column 135. The components extracted by the SFE are caught in the trap column 135 within the column oven, and then the extracted components are separated by the SFC analysis column 137 while the flow path provided with the SFC analysis column 137 is kept at a pressure exceeding the critical pressure by a back-pressure control valve 142.

In order to attain both trapping ability and suppression of an influence on the separation, the inner diameter of the SFC analysis column 137 is preferably equal to or about ⅓ times the inner diameter of the trap column 135. In order to improve separation ability by the SFC, the SFC analysis column 137 preferably has a length of about 5 to 50 times the length of the trap column 135.

The sample separated by the SFC analysis column 137 is sent together with a makeup solution, which is sent from a container 109 by a solvent pump 119, to the mass spectrometer provided downstream of the back-pressure control valve 142 and is subjected to mass spectrometry.

This analysis system retains, by the polymer bead filler in the trap column 135, the components extracted by the SFE, then simultaneously elutes the components caught in the trap column 135, and is thus capable of separating the components by the SFC analysis column 137 on the basis of the elution time. Therefore, this analysis system is applicable to simultaneous extraction and analysis of multiple components of residual agricultural chemicals in an agricultural product. Using the prescribed polymer beads as the filler in the trap column 135 suppresses, for example, splitting of a detection peak to give a good peak shape, thus facilitates waveform processing of the peak, and contributes to improvement of quantitativity of the analysis.

EXAMPLES

In Experiment Examples 1 to 3 below, the retaining behavior of the column filler was evaluated by supercritical fluid chromatography (SFC).

[Sample to be Analyzed]

PL2005 Pesticide GC-MS Mix I, II, III, IV, V, VI, and 7, PL2005 Pesticide LC-MS Mix I, II, III, 4, 5, 6, 7, 8, 9, and 10, and 53 Polar pesticides Mix for STQ method that are all manufactured by Hayashi Pure Chemical Ind., Ltd. were mixed to prepare an agricultural chemical standards mix solution containing 0.5 μg/mL of each of about 250 types of agricultural chemicals.

[Column]

In Experiment Example 1, a commercially available SFC analysis column (Shim-pack UC-RP) was used that was loaded with a filler of silica chemically modified with an octadecyl group and a polar functional group. In Experiment Examples 2 and 3, columns were used that were loaded with polymer beads respectively obtained in Preparation Examples 1 and 2 below and serving as the filler.

<Synthesis Example of Seed Particles>

Into a 500-mL separable flask were put 70 g of methyl methacrylate, 2.1 g of octanethiol, and 370 g of ion-exchanged water, and the mixture was warmed at 30° C. for 1 hour while bubbled with nitrogen and stirred with an agitating blade. Thereafter, 0.875 g of potassium peroxodisulfate and 30 g of ion-exchanged water were added to the mixture, which was reacted 70° C. for 6 hours to form seed particles. The reaction solution was cooled, and lumps and fine particles in the reaction solution were removed to give a slurry (solid content concentration: 3.5% by mass) of the seed particles. The lumps were removed using a sieve with an aperture of 75 μm. The fine particles were removed by treating the reaction solution (slurry having passed through the sieve) having the lumps removed therefrom with a centrifugal dehydrator and discarding a supernatant solution by decantation.

The seed particles had an average particle size of 750 nm and a CV value of 6.4%, which were calculated from a particle size distribution measured with a particle size distribution measuring apparatus (manufactured by Microtrac-BEL, trade name: MT-3300EX II).

Preparation Example 1: Divinylbenzene Polymer Beads

Into a 2-L separable flask were charged 100 g of divinylbenzene (purity: 94%) as the crosslinkable monomer, and 36 g of toluene and 36 g of diethylbenzene that served as the organic solvent, to give a mixture. In the mixture, 7.0 g of benzoyl peroxide as the polymerization initiator was dissolved. Next, 1240 g of ion-exchanged water, 96 g of ethanol, 32 g of an aqueous solution containing 40% by mass of triethanol amine lauryl sulfate as the surfactant, and 0.12 g of ascorbic acid as the polymerization initiator were further added to the mixture, which was then subjected to ultrasonic dispersion with an ultrasonic horn for 10 minutes to give an emulsified liquid. 77 g of the seed-particle slurry obtained in the synthesis example and 27 g of ion-exchanged water were added to the resultant emulsified liquid under stirring with an agitating blade and warmed at 30° C. for 24 hours. Next, 120 g of an aqueous solution containing 6% by mass of polyvinyl alcohol as the dispersion stabilizer was added to the emulsified liquid, which was polymerized at 80° C. for 8 hours while bubbled with nitrogen, and was then cooled. The resultant particles were sequentially washed with an ion-exchanged water-methanol mixed liquid and acetone and were then subjected to wet classification using a sieve with an aperture of 5 μm to remove aggregates. The slurry having the aggregates removed therefrom was filtered to give particles, which were dried to give polymer beads.

Preparation Example 2: Acrylic Polymer Beads

Into a 3-L separable flask were charged 81 g of glycerol dimethacrylate (purity: 93%) as the crosslinkable monomer, and 73 g of butyl acetate and 48 g of isoamyl alcohol that served as the organic solvent, to give a mixture. In the mixture, 0.4 g of 2,2'-azobisisobutyronitrile was dissolved as the polymerization initiator. Next, 1530 g of ion-exchanged water and 12 g of an aqueous solution containing 40% by mass of triethanol amine lauryl sulfate as the surfactant were further added to the mixture, which was then subjected to ultrasonic dispersion with an ultrasonic horn for 10 minutes to give an emulsified liquid. 14 g of the seed-particle slurry obtained in the synthesis example and 122 g of ion-exchanged water were added to the resultant emulsified liquid under stirring with an agitating blade and warmed at 30° C. for 1 hour. Next, 121 g of an aqueous solution containing 6% by mass of polyvinyl alcohol as the dispersion stabilizer was added to the emulsified liquid, which was polymerized at 78° C. for 5 hours while bubbled with nitrogen, and was then cooled. Similarly to Preparation Example 1, the resultant particles were washed, classified, filtered, and dried to give polymer beads.

<Characteristics of Polymer Beads>

(Degree of Crosslinking of Polymer)

Preparation Example 1 (divinylbenzene) had a degree of crosslinking of 94% and Preparation Example 2 (glycerol dimethacrylate) had a degree of crosslinking of 93%, the degree of crosslinking being calculating from the proportion of the mass of the multifunctional monomer in the total mass of the polymerizable monomers.

(Particle Size)

The particle size distribution of the polymer beads was measured with a particle size distribution measuring apparatus (manufactured by Beckman Coulter, Inc., trade name: Multisizer 4e). The divinylbenzene polymer beads in Preparation Example 1 had an average particle size of 3.1 μm and a CV value of the particle size of 18%. The acrylic polymer beads in Preparation Example 2 had an average particle size of 3.5 μm and a CV value of the particle size of 7%.

(Degree of Swelling)

1 g of the polymer beads dried at 60° C. in a vacuum dryer for 3 hours or more was charged into a 10-ml measuring cylinder, tapped 20 times or more, and left to stand still. Then, the scale of the measuring cylinder was read and defined as an apparent volume Vd (ml) of the polymer beads. A solvent (THF or methanol) was added to give 10 ml of the polymer beads and the solvent in total and left to stand still at room temperature (20° C.) for 24 hours or more. Then, an apparent volume Vw (ml) of the polymer beads deposited on the bottom of the measuring cylinder was read from the scale of the measuring cylinder, and a degree of swelling S was calculated by the following equation.

$$S=Vw/Vd$$

The divinylbenzene polymer beads in Preparation Example 1 had a degree of swelling of 1.32 with respect to THF and a degree of swelling of 1.31 with respect to methanol. The acrylic polymer beads in Preparation Example 2 had a degree of swelling of 1.05 with respect to THF and a degree of swelling of 1.37 with respect to methanol.

Experiment Example 1: Evaluation of Retention Capability of Silica Gel Filler

The column (Shim-pack UC-RP) loaded with the silica filler was set as the SFC analysis column in a supercritical fluid chromatography system (Nexera UC manufactured by SHIMADZU CORPORATION), and the sample to be analyzed was analyzed by SFC-MS/MS. The elution conditions of the SFC were as follows.

Mobile phase A: carbon dioxide (supercritical fluid), B: methanol (modifier)
Gradient Program
   0 to 12 minutes: % B=gradient of 2 to 10
   12 to 20 minutes: % B=gradient of 10 to 80
   20 to 25 minutes: % B=80
   25 to 30 minutes: % B=2

Experiment Examples 2 and 3: Evaluation of Retention Capability of Polymer Bead Filler The filler of the SFC analysis column was changed to the divinylbenzene polymer beads (Experiment Example 2) and to the acrylic polymer beads (Experiment Example 3), and the gradient program of the SFC was changed as follows. Except these changes, the sample to be analyzed was analyzed similarly to Experiment Example 1.
Gradient Program
   0 to 20 minutes: % B=gradient of 2 to 80
   20 to 25 minutes: % B=80
   25 to 30 minutes: % B=2

FIGS. 4A to 4C illustrate the MRM chromatograms in Experiment Examples 1 to 3 together with the gradient charts.

Experiment Example 1 using the column with the silica filler allowed almost all the components to be eluted when the concentration of the modifier was 10% or less (within 12 minutes of the retention time). Experiment Examples 2 and 3 using the column with the resin filler, however, had a longer retention time than the retention time of Experiment Example 1 regardless of the fact that the concentration of the modifier was increased in a shorter time than in Experiment Example 1, and it is clear that the fillers in Experiment Examples 2 and 3 had high force for retaining the agricultural chemical components. Particularly, Experiment Example 3 using the acrylic polymer beads as the filler had a longer retention time than the retention time of the divinylbenzene polymer beads, and it is clear that the filler in Experiment Example 3 had excellent force for retaining the agricultural chemical components.

When each of the agricultural chemical components is focused, Experiment Example 2 using the divinylbenzene beads did not allow the detection of clear peaks of resmethrin, benthiocarb, bromophos-methyl, bifenthrin, tolchlofos-methyl, prothiofos, fenoxaprop-ethyl, nitralin, sulprophos, carbophenothion, hexythiazox, and silafluofen among the agricultural chemicals contained in the agricultural chemical standards mix solution (upper chromatograms in FIGS. 5-1 and 5-2). Experiment Example 3 using the acrylic polymer beads, however, allowed the detection of sharp peaks of these agricultural chemicals and were confirmed that many agricultural chemical components were appropriately retained in the column filler.

As described above, it is clear that the polymer bead fillers have higher retaining force than the retaining force of the silica filler. These results make clear that using, as the filler of the trap column in the supercritical fluid extraction, the polymer beads in place of the silica filler allows the extracted components to be kept in the trap column even when the trap column is provided upstream of the back-pressure control valve and the extraction is performed at a high concentration of the modifier. Therefore, the supercritical fluid extraction using the polymer beads as the filler of the trap column improves the recovery rate of the extracted components and enables simultaneous analysis of multiple components of agricultural chemicals or the like to be attained with high precision.

Experiment Example 4: Evaluation of Retention Capability of Polymer Bead Filler by Online SFE-SFC-MS System A 4.6 mmϕ×10 mmϕ column that was loaded with the acrylic polymer beads similar to in Experiment Example 3 and served as the trap column was connected upstream of an SFE column of an online SFE-SFC-MS system including, as the SFC analysis column, a 4.6 mmϕ×250 mm column (Shim-pack UC-RP) loaded with a silica filler, and the agricultural chemical standards mix solution was analyzed by SFE-SFC-MS/MS analysis. FIG. 6 illustrates the chromatograms of acibenzolar acid, acifluorfen, lufenuron, mesosulfuron-methyl, foramsulfuron, and acetamiprid when the trap column was connected (upper chromatograms) and when the trap column filled with the acrylic polymer beads was connected (lower chromatograms). It is clear that the provision of the trap column resolves the splitting of peaks in the chromatograms and allows the chromatograms to have high symmetric peaks.

DESCRIPTION OF REFERENCE SIGNS 10 supercritical fluid extraction apparatus
101 cylinder
111 pressure pump
102, 106, 108, 109 solvent container
112, 119 solvent pump
120 extraction unit
125 extraction container
130 collection unit
135 trap column
137 SFC analysis column
139 detector
140, 141, 142 back-pressure control valve
150 recovery unit
155 recovery container
180 mass spectrometer

The invention claimed is:

1. A method for recovering an extracted component, the method comprising the steps of:
   introducing carbon dioxide in a supercritical state and a modifier into a container that is disposed upstream of a back-pressure control valve and stores a sample, and extracting an agricultural chemical component contained in the sample;
   introducing the agricultural chemical component that has been extracted into a trap column together with the carbon dioxide and the modifier, and collecting the agricultural chemical component in the trap column; and
   introducing an eluent into the trap column to elute the agricultural chemical component, and recovering the agricultural chemical component that has been eluted,
   wherein the trap column being loaded with polymer beads as a filler, and
   a crosslinked polymer contained in the polymer beads has a degree of crosslinking of 50% or more,
   wherein the agricultural chemical component is at least one selected from the group consisting of resmethrin, benthiocarb, bromophos-methyl, bifenthrin, tolchlofos-methyl, prothiofos, fenoxaprop-ethyl, nitralin, sulprophos, carbophenothion, hexythiazox, and silafluofen.

2. The method according to claim 1, wherein a plurality of types of the components extracted from the sample are collected in the trap column.

3. The method according to claim 1, wherein the trap column is disposed upstream of the back-pressure control valve.

4. The method according to claim 1, wherein the polymer beads contain a crosslinked polymer, and have a degree of swelling of 1.4 or less when absorbing either tetrahydrofuran or methanol.

5. The method according to claim 1, wherein the polymer beads are acrylic polymer beads.

6. An analysis method comprising the steps of:
   introducing carbon dioxide in a supercritical state and a modifier into a container that is disposed upstream of a back-pressure control valve and stores a sample, and extracting an agricultural chemical component contained in the sample;
   introducing the agricultural chemical component that has been extracted into a trap column together with the carbon dioxide and the modifier, and collecting the agricultural chemical component in the trap column;
   introducing an eluent into the trap column to elute the agricultural chemical component; and
   analyzing the agricultural chemical component that has been eluted by chromatography and/or mass spectrometry,
   wherein the trap column being loaded with polymer beads as a filler, and
   a crosslinked polymer contained in the polymer beads has a degree of crosslinking of 50% or more,
   wherein the agricultural chemical component is at least one selected from the group consisting of resmethrin, benthiocarb, bromophos-methyl, bifenthrin, tolchlofos-methyl, prothiofos, fenoxaprop-ethyl, nitralin, sulprophos, carbophenothion, hexythiazox, and silafluofen.

7. The analysis method according to claim 6, wherein the trap column is disposed upstream of the back-pressure control valve.

* * * * *